United States Patent
Preissinger et al.

(10) Patent No.: US 10,005,407 B2
(45) Date of Patent: Jun. 26, 2018

(54) MOTOR VEHICLE CONFIGURATION SYSTEM

(75) Inventors: Joerg Preissinger, Munich (DE); Tobias Schoellermann, Eichenau (DE); Rainer Steffen, Munich (DE)

(73) Assignee: Bayerische Motoren Werke Aktiengesellschaft, Munich (DE)

( * ) Notice: Subject to any disclaimer, the term of this patent is extended or adjusted under 35 U.S.C. 154(b) by 304 days.

(21) Appl. No.: 13/048,272

(22) Filed: Mar. 15, 2011

(65) Prior Publication Data
US 2011/0237186 A1   Sep. 29, 2011

(30) Foreign Application Priority Data
Mar. 16, 2010   (DE) .................. 10 2010 002 928

(51) Int. Cl.
*H04B 5/00*  (2006.01)
*H04Q 5/22*  (2006.01)
(Continued)

(52) U.S. Cl.
CPC ................................. B60R 16/037 (2013.01)

(58) Field of Classification Search
CPC ... H04B 7/00; H04B 5/00; H04B 1/38; H04Q 5/22; H04M 1/00; G09G 5/00; G08B 3/00
USPC .......... 180/329, 90, 326, 334; 710/8, 72, 36, 710/49; 701/36, 49; 340/5.61–5.64, 340/5.72, 426.1, 426.14, 426.36, 10.1; 318/567; 307/10.1; 455/41.1, 41.2, 41.3
See application file for complete search history.

(56) References Cited

U.S. PATENT DOCUMENTS 6,259,362 B1 *  7/2001  Lin ............................. 340/457
6,584,389 B1    6/2003  Reimann et al.
(Continued)

FOREIGN PATENT DOCUMENTS

DE   199 43 484 A1   3/2001
DE   101 08 578 A1   2/2002
(Continued)

OTHER PUBLICATIONS

German Search Report dated Mar. 18, 2011 including partial English-language translation (Nine (9) pages).

*Primary Examiner* — Edward Urban
*Assistant Examiner* — Ralph H Justus
(74) *Attorney, Agent, or Firm* — Crowell & Moring LLP

(57) ABSTRACT

Motor vehicle configuration system, including a motor vehicle, in the interior of which at least one transponder that is capable of wireless near field communication is attached and which has a receiving unit for wireless reception of vehicle configuration data over a wireless communication link independent of the wireless near field communication. A portable device has at least one data memory for storing the memory data and has a transmitting unit for a wireless transmission of data on the basis of the memory data. The portable device is programmed such that, when an approach of the portable device to a transponder is detected on the basis of wireless near field communication, the data are transferred from the portable device to the motor vehicle a wireless communication link between the transmitting unit and the receiving unit for the purpose of providing the motor vehicle with configuration data. The communication link is independent of the wireless near field communication.

14 Claims, 1 Drawing Sheet

(51) Int. Cl.
    *H04B 1/38*         (2015.01)
    *B60R 16/037*     (2006.01)

(56) References Cited

U.S. PATENT DOCUMENTS

| | | | |
|---|---|---|---|
| 7,725,077 B2 * | 5/2010 | Jung et al. | 455/41.2 |
| 7,769,345 B2 * | 8/2010 | Johnson et al. | 455/41.1 |
| 8,432,262 B2 * | 4/2013 | Talty et al. | 340/10.51 |
| 2001/0052858 A1 * | 12/2001 | Vincent et al. | 340/825.69 |
| 2007/0224937 A1 * | 9/2007 | Jung et al. | 455/41.2 |
| 2007/0224938 A1 * | 9/2007 | Jung et al. | 455/41.2 |
| 2007/0224939 A1 * | 9/2007 | Jung et al. | 455/41.2 |
| 2007/0238481 A1 * | 10/2007 | Gaucherot | 455/550.1 |
| 2008/0045274 A1 * | 2/2008 | Witkowski et al. | 455/569.2 |
| 2008/0064332 A1 | 3/2008 | Lee et al. | |
| 2009/0096576 A1 * | 4/2009 | Oman et al. | 340/5.62 |
| 2009/0322493 A1 * | 12/2009 | Kumagai et al. | 340/10.51 |
| 2010/0234071 A1 * | 9/2010 | Shabtay et al. | 455/562.1 |
| 2011/0105097 A1 * | 5/2011 | Tadayon et al. | 455/418 |
| 2011/0210831 A1 * | 9/2011 | Talty et al. | 340/10.51 |

FOREIGN PATENT DOCUMENTS

| | | |
|---|---|---|
| DE | 10 2004 020 255 A1 | 9/2005 |
| DE | 10 2006 057 430 A1 | 6/2008 |

* cited by examiner

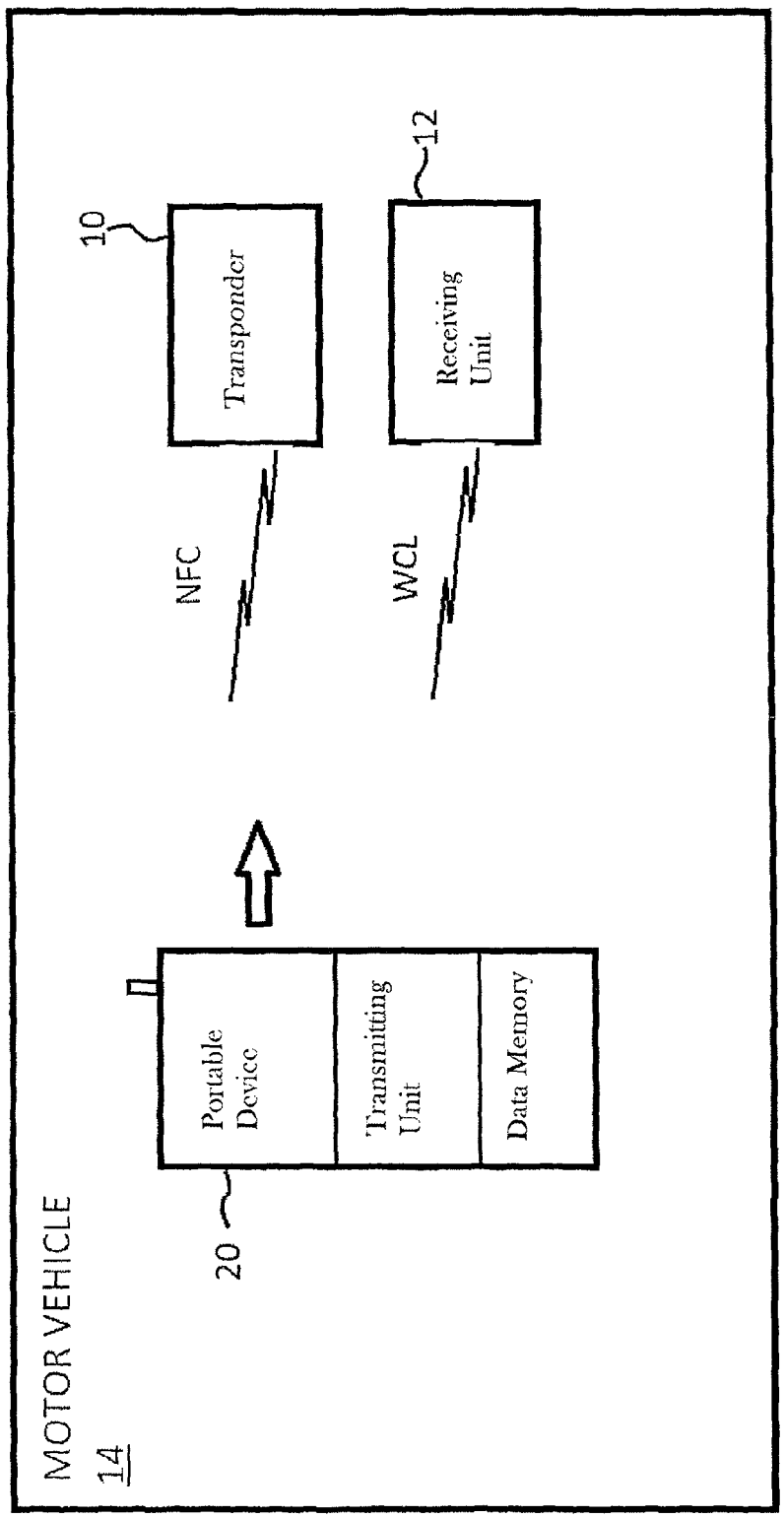

MOTOR VEHICLE CONFIGURATION SYSTEM

CROSS-REFERENCE TO RELATED APPLICATIONS

This application claims priority under 35 U.S.C. § 119 from German Patent Application No. DE 10 2010 002 928.9, filed Mar. 16, 2010, the entire disclosure of which is herein expressly incorporated by reference.

BACKGROUND AND SUMMARY OF THE INVENTION

The invention relates to a motor vehicle configuration system.

Modern motor vehicles may have a plurality of configurations as a function of the detection of the presence of a specific vehicle occupant in the interior of the vehicle. For example, navigation configurations (for example, address book), entertainment configurations (for example, radio stations saved to memory), communication configurations (for example, telephone book) or comfort configurations (for example, air conditioner adjustments and/or seat adjustments) of a motor vehicle can be made as a function of the driver's identity, which can be established in a targeted way, for example, by the use of a certain vehicle key or, as an alternative, also with the assistance of a camera or by means of biometric features.

The object of the invention is to design the configuring of a motor vehicle in an even simpler way or, more specifically, in an even more convenient way.

The motor vehicle configuration system according to an exemplary embodiment of the invention comprises a motor vehicle that is to be configured and a portable device, in particular, a so-called portable CE (consumer electronic) device, in particular, a mobile phone. However, as an alternative, the portable device may also be constructed as a digital camera, a laptop, a vehicle key, a device for playing back multimedia data, etc. The interior of the motor vehicle has at least one transponder (for example, a so-called NFC tag or any other passive transponder that can be recognized or, more particularly, read out by the portable device) and that is capable of wireless near field communication (for example, by means of the transmission standard—near field communication, or also called NFC in short). In addition, the motor vehicle has a receiving unit, which is capable of receiving wirelessly the vehicle configuration data over a wireless communication link that is independent of the wireless near field communication (for example, via Bluetooth or WLAN, Zigbee, mobile radio [GSM, GPRS, UMTS, . . . ] or by means of a proprietary radio link, for example the vehicle key in the UHF range).

The portable device is also capable of wireless near field communication (in particular, "NFC enabled") and is capable of detecting an approach of the portable device to the transponder by means of near field communication. Furthermore, the portable device has at least one data memory for storing the memory data and a transmitting unit, which is capable of sending wirelessly transmission data on the basis of the memory data, stored in the data memory, by way of a wireless communication link (for example, via Bluetooth) that is independent of the wireless near field communication. The portable device is programmed in such a way that it can transfer the transmission data to the motor vehicle, in order to provide the motor vehicle with vehicle configuration data. The transfer takes place when an approach of the portable device to the transponder is detected on the basis of a wireless near field communication. This transfer takes place over a wireless communication link between the transmitting unit and the receiving unit. This communication link is independent of the wireless near field communication.

The invention makes it possible to create the motor vehicle configurations in a motor vehicle by merely bringing a portable device into close proximity of a transponder in the interior of the motor vehicle. This strategy significantly enhances the comfort of a vehicle occupant.

The transmission data can be designed directly as the motor vehicle configuration data. Then, the motor vehicle sided processing effort is quite small. However, the transmission data may also exhibit a different data format that can be converted into motor vehicle configuration data by a computer unit that is downstream of the receiving unit in the motor vehicle. Under some circumstances this arrangement can reduce the quantity of data to be sent.

Furthermore, the transmission data can be identical to the memory data or, more specifically, identical to an extract of the memory data. Then the processing effort required on the part of the portable device prior to sending is quite small. However, the transmission data may also have a different data format that is not generated by the portable device until before the transmission. This feature permits, for example, the use of one and the same memory data record for configuring different motor vehicles; this feature also allows the respective type of motor vehicle or rather the recognition of an individual motor vehicle (the type of motor vehicle or more specifically the individual motor vehicle identification may be stored, for example, in the transponder or can be assigned by means of an individual identification of the transponder) to be considered, and also permits the motor vehicle specific transmission data to be sent.

BRIEF DESCRIPTION OF THE DRAWING

FIG. 1 is a simplified block diagram illustrating components of the motor vehicle configuration system in accordance with an embodiment of the invention.

DETAILED DESCRIPTION OF THE DRAWING

With reference to the FIGURE, according to a preferred embodiment of the invention, at least one transponder 10 is constructed as a passive NFC tag in conformity with one of the standards—ISO 14443 or ISO 18092 FeliCa. The different tag types are standardized in accordance with the NFC transmission standard (by the so-called NFC forum). These tag types are provided with a number ranging from 1 to 4. The NFC tag types differ in the HF interface, the transmission rate, the memory size and the set of protocols. Three of the four tag types are based on the smartcard standard ISO 14443; another, on the ISO 18092 FeliCa. The portable device 20 is constructed preferably as a mobile telephone. In the meantime the NFC enabled mobile telephones have become increasingly more available on the market. Thus, in many cases the implementation of the invention on the basis of an NFC based near field communication makes it possible to use a portable device that the vehicle user possesses in any event. The only requirement is that this portable device has to be suitably programmed in order to implement the invention. There is no need for a special purchase.

The wireless communication link (WCL) that is independent of the wireless near field communication (NFC) is designed preferably as a Bluetooth link. Owing to the larger range of a Bluetooth link, a Bluetooth data transmission can usually occur from any point in the vehicle interior. Thus, a single motor vehicle sided receiving unit 12 suffices for the purposes of the invention. In addition, many modern motor vehicles 14 and most mobile telephones are already equipped with Bluetooth communication means in any event. Therefore, the additional expense for equipment to implement the invention is low or irrelevant.

Especially in the case of a Bluetooth link, the wireless communication link that is independent of the wireless near field communication can be automatically established in the well-known manner if the portable device is brought into the range of the motor vehicle sided receiving unit. However, as an alternative, said communication link can also be established only on detection of the approach of the portable device to the transponder. This arrangement makes it possible to avoid setting up and maintaining a link that would otherwise be unnecessary.

According to an especially preferred embodiment of the invention, the interior of the motor vehicle 14 has a plurality of transponders that are capable of wireless near field communication. Then, in addition, the portable device is capable preferably (or more specifically suitably programmed) of detecting which of the several transponders it is approaching. This strategy permits various transmission data to be transferred from the portable device to the motor vehicle as a function of the respective transponder. For example, the portable device can send to the motor vehicle the transmission data that are used to adjust the first vehicle seat when said portable device approaches a transponder that is mounted in a first vehicle seat. On approaching a transponder mounted in a second vehicle seat, the portable device can send to the motor vehicle, for example, the transmission data that are used to adjust the second vehicle seat. On approaching a transponder mounted in an air conditioner control component, the portable device can send to the motor vehicle, for example, transmission data that are used to adjust the air conditioner system that can be controlled by this air conditioner control component.

It appears to be especially advantageous, if at least one of the multiple transponders that are capable of wireless near field communication, is assigned a specific location in the motor vehicle. Preferably even the plurality of multiple transponders or even all of the multiple transponders are assigned in each case a specific location in the motor vehicle. Then on detection of an approach of the portable device to the respective transponder, the transmission data can be transferred to the motor vehicle, and they in turn provide the motor vehicle with the vehicle configuration data that are at least partially specific to the respective location (for example, seat settings or sound settings) of the motor vehicle. The assignment of the transponder to the location can be recognizable to a vehicle occupant in that the transponder is mounted in an access region that is easily reachable by a vehicle occupant sitting in this location. This arrangement can be achieved for a rear seat, for example, by mounting on the rear side of the backrest or the headrest of the front seat located in front of it. For a front seat the same can be accomplished, for example, by mounting on a dashboard. However, it is often the case that the interior sides of vehicle doors are in the conveniently reachable access region.

Instead of transferring the already transponder specific or location specific transmission data to the motor vehicle, it is, of course, also possible to transfer to the motor vehicle just a pointer to this transponder and/or this location.

Then, the transponder independent or, more specifically, location independent transmission data can be transferred first to the motor vehicle, and not until on the motor vehicle side are the location specific vehicle configuration data generated by means of the additionally obtained pointer to the transponder or more specifically to the location.

Especially if the at least one transponder is already provided in the motor vehicle at the plant, it is advantageous to mount it under a cover in the interior of the motor vehicle, for example, embedded in a synthetic plastic component just under the surface or under the cover of a vehicle seat or a headrest. As a result, the transponder cannot be, for example, destroyed or inadvertently removed. In this case the material and the thickness of the cover are designed preferably in such a way that the near field communication is not degraded or just slightly degraded. In order for the vehicle occupant to know, nevertheless, how or where a desired approach of the portable device must take place, the cover can exhibit preferably an optically detectable marking as a pointer to the mounting place or more specifically a detection range of the transponder.

A retrofitting of transponders is facilitated, if the at least one transponder has an adhesive face and can be glued on a surface in the interior of the motor vehicle. Conceivable are also hybrids, where some transponders are already installed into the motor vehicle at the plant, and others, for example, are retrofitted by gluing. The software components of the motor vehicle or the portable device that are involved are designed so that preferably they can be expanded accordingly.

According to a first variant of the invention, the portable device has a user interface, which is capable of influencing which transmission data shall be sent in the event of a detection of an approach of the portable device to a transponder of the motor vehicle and/or which vehicle configuration data shall be provided to the motor vehicle in the event of a detection of an approach and/or which vehicle configurations shall be made in the event of a detection of an approach.

According to a second variant, the motor vehicle has a user interface, which is capable of influencing which transmission data shall be sent in the event of a detection of an approach of the portable device to a transponder of the motor vehicle and/or which vehicle configuration data shall be provided to the motor vehicle in the event of a detection of an approach and/or which vehicle configurations shall be made in the event of a detection of an approach.

If the portable device is supposed to send the transmission data that exceed a mere identification of the transponder and/or an arrangement of the transponder or the like, then it is self-evident that the portable device must also be programmable starting from the user interface of the motor vehicle as a function of this influencing.

According to a third variant, the mobile telephone (and optionally also the motor vehicle) can be influenced by a third computer unit (for example, a home PC) as to which transmission data shall be sent in the event of a detection of an approach of the portable device to a transponder of the motor vehicle and/or which vehicle configuration data shall be provided to the motor vehicle in the event of a detection of an approach and/or which vehicle configurations shall be made in the event of a detection of an approach.

According to an advantageous further development of the invention, the transponder has specification information (for example, protocol or software variants) regarding a potential wireless communication link that is independent of the wireless near field communication. This specification information is read out preferably via near field communication by the portable device when it approaches the transponder. In this way it is possible to set up, taking into consideration this specification information, the wireless communication link between the transmitting unit and the receiving unit that is independent of the wireless near field communication, or it is possible to communicate, taking into consideration this specification information, over this communication link.

The above descriptions relate to some extent to the so-called NFC (near field communication) technology. The NFC technology is an RFID based wireless communication technology that is being installed more and more into mobile telephones, chipcards and the like. On the basis of this technology an active device (provided with power) can communicate with a passive NFC label or NFC tag over a short distance. The main driving force of this technology is the extremely simple and intuitive usability to initiate an action. Known applications provide, for example, that a mobile phone is held to an NFC business card (that is, to bring it within close proximity, for example, less than 10 cm distance, of the business card).

Then, the address data are displayed on the mobile phone and can be included in the telephone book by just one touch of a button. An NFC label consists of an antenna and a tiny microchip and can be integrated, for example, into business cards, stick-ons or also chip cards.

At the present time mobile phones with NFC technology can read out predominantly small passive, cost effective NFC/RFID labels and process the information contained therein. In this way information about an object can be read out, a URL can be transferred and retrieved, or information on Bluetooth pairing with a vehicle can be read out.

To the extent that the present description discusses the transfer of data, for example, from the portable device to the motor vehicle and/or discusses a receiving unit that is a part of the motor vehicle, it is not absolutely imperative that the simplest case, that is, that of a unidirectional data transmission, is to be understood. Rather data may also be transferable in the other direction. That is, a bi-directional exchange of data may take place. Similarly a unidirectional transfer may include a bi-directional flow of data (for example, the handshake process).

A preferred exemplary embodiment of the invention is described below. The results of this description include additional details, preferred embodiments and further developments of the invention. Without limiting the general nature of the invention, the discussion below focuses exclusively on the preferred case that the portable device is designed as a mobile telephone. It has already been pointed out in an earlier passage that as an alternative the portable device may also be a different device, in particular a CE device, for example, a laptop, a camera, a device for playing back multimedia data or also a vehicle key.

The prior art discloses a wide variety of applications, wherein mobile phones interact with vehicles and may produce jointly the functionality. This communication can be achieved by wireless means (WLAN, Bluetooth) or via a cable connection. The result may be both just a simple transmission of data (for example, multimedia data, like music, films, etc. from phone to vehicle or vice versa) or produce jointly the functionality. There are even applications, in which the mobile phone can control parts of the vehicle, for example, settings (air conditioner system, seats, . . . ), multimedia selection, etc.

The joint production of functionality by means of the mobile phone and the vehicle offers a powerful potential. The more functionality (for example, adjusting the settings of the vehicle on the mobile telephone) is integrated in this manner, the more complicated and less intuitive the usability of the respective software application is. However, the current state of the art does not provide an automated preselection of the functionality. As a result, the usability of a software application, which allows the mobile phone to adjust selectively (for example) the settings, allows multimedia data to be transferred to the vehicle and allows information (user's instructions) about a wide variety of parts of the vehicle to be displayed on the mobile phone, can become very complicated.

In order to make the usability as simple and intuitive as possible, a system for location based (that is, as a function of the position of the mobile phone inside the vehicle) preconfiguration of the software application is proposed.

An NFC label can be attached to characteristic or rather relevant places in the vehicle and can transmit information about the location and operating principle. For example, an NFC label that is marked with a symbol can be located next to each rear seat display, at each seat, at the CID (central information display), etc., just to name a few possible places. The position of each label in the vehicle is highlighted (or the position and/or desired functionality is derived in some other way). An NFC enabled mobile phone of the driver or another vehicle occupant has to be held to one of these characteristic or rather relevant places for only a short period of time, and already a software application of the mobile phone is invoked and preconfigured for the respective functionality.

In this case the software application is preferably designed specifically for a certain type of vehicle (defined, for example, by its make, series and/or model) or even more specifically for a certain vehicle. The software application can also be offered by the manufacturer of the vehicle or a marketing partner. Then, the vehicle user can download free of charge or at a markup the software application to his mobile phone and use it with the phone. The software application can also be designed so as to be configurable.

An NFC label can be installed in the vehicle both stationarily during production and also retrofitted, for example, in the form of a stick-on by the vehicle user himself or at a service center.

These options lead to such utilization scenarios, as the one described below.

Scenario 1: A vehicle user could store the settings of a seat position and air conditioner settings in his own mobile phone and transfer them into the vehicle via Bluetooth. Instead of entering a vehicle and then calling the software application on the mobile telephone at a certain location (for example, right rear) and then selecting the location, at which the settings are to be adjusted, this function could be implemented as follows. The vehicle user enters the vehicle and then holds his mobile phone to an optically marked position, at which there is an NFC label, for a short period of time. Thereupon the mobile phone reads out the data from the NFC label, automatically starts a vehicle specific software application and automatically transfers within the framework of this software application the personal settings to the vehicle together with the instructions that these settings are to be applied to the occupied location (in this case: right rear, recognized by the NFC label). The vehicle automatically accepts the transferred settings.

If no settings whatsoever or at least no settings for the specific location have been stored yet in the mobile phone, then the software application is configured as a consequence of the approach of the mobile phone to the NFC label at least for the purpose of adjusting the seat settings at the occupied location (in this case: right rear, recognized by the NFC label), so that the mobile phone shows the range of functions specifically for this location and/or seat (which can differ from the front seat, for example, in its adjustment options) for adjustment purposes. In this case the term "approach" is understood to mean a very narrow approach in the range of a few centimeters or even millimeters. In everyday parlance it is often said, instead of "approach", that the mobile phone is held "to the NFC label" (or "to" an object provided with the label). Contact is not absolutely imperative for wireless NFC technology, but usually not detrimental.

Scenario 2 (combinable with scenario 1): If the user of the mobile telephone is in the process of watching multimedia contents on the mobile phone, for example, news, or is browsing the Internet, then an approach to a characteristic place highlighted with an NFC label can trigger, besides a rear seat display (for example, right rear), the following automatic reaction (which requires a number of selection steps according to the prior art). The mobile phone is clearly localized by means of the NFC label, the multimedia content that is being viewed is transferred to the vehicle (or more specifically the URL that was currently viewed in the browser of the cell phone) and is displayed on the respective rear seat display (in this case: right rear). If a multimedia content was not being viewed at that instant, then the approach of the mobile phone to the NFC label initiates, nevertheless, a preconfiguration of the software application. The mobile phone shows immediately the control elements for entertainment in the vehicle, and the selection actions relate automatically to the "correct" display (in the example, right rear).

The implementation of the above scenarios can be achieved, for example, on the basis of a joint usage of wireless communication technologies having an average range (in particular, Bluetooth) and NFC. Then Bluetooth can be used predominantly for transferring data; NFC, predominantly for localization of the mobile phone in the interior of the vehicle.

Then the so-called software application on the mobile phone controls the functions in the vehicle via a wireless link (for example, Bluetooth) and exchanges the data with the vehicle, preferably bidirectionally. In this way a vehicle user can bring with him the multimedia contents into the vehicle and also take them along with him again. In this way the vehicle user can adjust the settings in the vehicle and display, or more specifically have displayed, the information from the vehicle (for example, user's instructions, pointers) on the mobile phone. However, this approach is expanded to include a location-dependent preconfiguration of the distributed software application and the resulting functionality that is produced in this way. Since an NFC label that is mounted in the vehicle is read out beforehand, a spatial reference point (and optionally a functional reference point that is linked to the spatial reference point) of the settings to be adjusted is recognized, and the user intended functionality is recognized so that the vehicle and the mobile phone can be preconfigured accordingly. Reference points can be not only the specific places at or in the environment of the seats and displays but also naturally other characteristic or more specifically relevant places, for which a functionality is provided. For example, the engine compartment may have an NFC label; after this NFC label is read out, certain parts of the operating instructions (refill of fluids, etc.) are displayed on the mobile phone.

In addition to retrofitting a vehicle with NFC labels at the plant, NFC labels could be purchased by the vehicle user or optionally also by the dealerships, the service centers and/or other retailers and mounted in the vehicle (in particular, glued into the vehicle) by the vehicle user himself. Hence, hardware costs are incurred only for the NFC labels that the vehicle user really wants.

The vehicle user himself could also prepare corresponding "functional bookmarks" in the form of NFC labels for his requirements by means of a respective functionality in the software application of the mobile phone. Assuming that the vehicle user often uses on the mobile phone a function of the software application that typically can be reached only through a plurality of operating steps in the operating structure of the mobile phone (for example, in the third submenu), then he himself could store a functional link to this submenu with the mobile phone on an empty NFC label and could glue this NFC label into the vehicle. A comparable configurability can also be provided, as a matter of fact, for NFC labels that already exist in the vehicle.

A major advantage of the invention lies in the (as compared to the prior art) significantly simpler, faster and more intuitive usability of an application that is produced jointly by the vehicle and the mobile phone. The many entries that the prior art demands of the vehicle user cease to be applicable: calling the software application on the mobile phone, changing the selection of the functionality (changing the settings, transferring the settings, transferring the multimedia data, displaying the instructions from the vehicle, selecting the exact chapter of the instructions).

Even the tweaking of different mobile phones to different head units or more specifically different ranges of functions or generations of functions in the vehicle can be facilitated with the invention. Not only the actual "functional bookmark" but also the information about the protocol or software variant that is to be used by the software application in the mobile telephone can be encoded in each of the NFC labels in order to communicate with the head unit of the vehicle via Bluetooth.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. A motor vehicle configuration system, comprising:
a plurality of target transponders, each attached to a unique corresponding location interior to a motor vehicle and configured to establish respective wireless near-field-communication links over which location identification data unique to each transponder is transmitted, the plurality of target transponders including:
a first target transponder located at a first location inside the motor vehicle, and
a second target transponder located at a second location inside the motor vehicle;
a wireless receiving unit configured to wirelessly receive personal settings data over a wireless communication link independent of the respective near-field-communication links;
a portable device including:
a memory configured to store first personal settings data that is specific to the first location, and second personal settings data that is specific to the second location,
an initiator transponder configured to establish a first wireless near-field-communication link with the first target transponder in response to the portable device approaching the first target transponder, and a second wireless near-field-communication link with the second target transponder in response to the portable device approaching the second target transponder, and a wireless transmitter configured to transmit the first personal settings data over the wireless communication link in response to the portable device establishing the first near-field-communication link with the first target transponder and to receiving first location identifying information thereover, and to transmit the second personal settings data over the wireless communication link in response to the portable device establishing the second near-field-communication link with the second target transponder and to receiving second location identifying information thereover, wherein each of the plurality of target transponders capable of wireless near-field-communication is assigned a specific display unit of the motor vehicle from a plurality of display units in the motor vehicle, and wherein upon detecting the approach of the portable device to one of the plurality of target transponders multimedia data are transferred from the portable device to the motor vehicle for display on the assigned specific display unit.

2. The motor vehicle configuration system, as claimed in claim 1, wherein the plurality of target transponders are constructed as a passive NFC tag in conformity with one of an ISO 14443 and ISO 18092 FeliCa standard.

3. The motor vehicle configuration system, as claimed in claim 1, wherein the portable device is a mobile phone.

4. The motor vehicle configuration system, as claimed in claim 1, wherein the wireless communication link that is independent of the wireless near-field-communication is configured to respond to the detection of the approach of the portable device to at least the first transponder and second transponder.

5. The motor vehicle configuration system, as claimed in claim 1, wherein the wireless communication link that is independent of the wireless near-field-communication is configured as a Bluetooth link.

6. The motor vehicle configuration system, as claimed in claim 1, wherein upon detecting the approach of the portable device to a particular one of the plurality of target transponders, a pointer to at least one of such target transponder and a corresponding location is transferred to the motor vehicle.

7. The motor vehicle configuration system, as claimed in claim 1, wherein at least one of the first transponder and second transponder is arranged under a cover in the interior of the motor vehicle.

8. The motor vehicle configuration system, as claimed in claim 7, wherein the cover exhibits an optically detectable marking as a pointer to at least one of a mounting place and a detection range of the at least one of the first transponder and the second transponder.

9. The motor vehicle configuration system, as claimed in claim 1, wherein at least one of the first transponder and the second transponder has an adhesive face and is attachable on a surface in the interior of the motor vehicle.

10. The motor vehicle configuration system, as claimed in claim 1, wherein a user interface of the portable device is capable of influencing at least one of the following:
 (a) which of the first and second personal settings data shall be sent in an event of a detection of an approach of the portable device to at least one of the first transponder and the second transponder; and
 (b) which personal settings shall be made in an event of a detection of an approach.

11. The motor vehicle configuration system, as claimed in claim 10, wherein the portable device is programmable starting from the user interface of the motor vehicle as a function of the influencing.

12. The motor vehicle configuration system, as claimed in claim 1, wherein:
 at least one of the first transponder and the second transponder has specification information regarding a potential wireless communication link that is independent of the wireless near-field-communication; and
 the specification information is readable by the portable device via near-field-communication, in order to at least one of:
 (a) set up, taking into consideration this specification information, the wireless communication link between the transmitter and the receiving unit, and
 (b) communicate, taking into consideration this specification information, over this communication link.

13. The motor vehicle configuration system, as claimed in claim 1, wherein the portable device is operatively configured to execute a software application preconfigurable on detection of the approach of the portable device, as a function of a particular one of the plurality of transponders, for a certain functionality that is assigned to such particular transponder and/or that is assigned to a position in the vehicle interior recognizable by the transponder.

14. The motor vehicle configuration system, as claimed in claim 1, wherein the transmitted first and second personal settings data comprises at least one of seat setting data, air conditioning setting data and sound setting data.

* * * * *